United States Patent
Tyagi et al.

(10) Patent No.: US 11,224,049 B2
(45) Date of Patent: Jan. 11, 2022

(54) DYNAMIC CHANNEL SELECTION IN IEEE 802.11 NETWORKS

(71) Applicant: CENTRE FOR DEVELOPMENT OF TELEMATICS, Karnataka (IN)

(72) Inventors: Vipin Tyagi, New Delhi (IN); N. V. Vishnu Murthy, Karnataka (IN); Sandeep Agrawal, Karnataka (IN); Suja S., Karnataka (IN); Naveen K. V., Karnataka (IN); Krishnam Raju M., Karnataka (IN); Manjula B. R., Karnataka (IN); Kavita Mathur, Karnataka (IN); Diganta Jena, Karnataka (IN); Sridhar K., Karnataka (IN); Aswathy A., Karnataka (IN); Biswaranjan Sahoo, Karnataka (IN)

(73) Assignee: CENTRE FOR DEVELOPMENT OF TELEMATICS, Karnataka (IN)

( * ) Notice: Subject to any disclaimer, the term of this patent is extended or adjusted under 35 U.S.C. 154(b) by 0 days.

(21) Appl. No.: 16/638,030

(22) PCT Filed: Aug. 13, 2018

(86) PCT No.: PCT/IN2018/050527
§ 371 (c)(1),
(2) Date: Feb. 10, 2020

(87) PCT Pub. No.: WO2019/030779
PCT Pub. Date: Feb. 14, 2019

(65) Prior Publication Data
US 2020/0221466 A1   Jul. 9, 2020

(30) Foreign Application Priority Data
Aug. 11, 2017 (IN) .............................. 201741028737

(51) Int. Cl.
*H04W 72/08* (2009.01)
*H04W 84/12* (2009.01)

(52) U.S. Cl.
CPC .......... *H04W 72/082* (2013.01); *H04W 84/12* (2013.01)

(58) Field of Classification Search
CPC .................................................. H04W 72/082
See application file for complete search history.

(56) References Cited

U.S. PATENT DOCUMENTS

| 2006/0029023 A1 | 2/2006 | Cervello et al. |
| 2009/0238152 A1* | 9/2009 | Hans .................. H04W 72/085 370/335 |

(Continued)

OTHER PUBLICATIONS

Zhou et al.; "Channel Assignment for WLAN by Considering Overlapping Channels in SINR Interference Model"; International Conference on Computing, Networking and Communications, Wireless Ad Hoc and Sensor Networks Symposium; 2012; pp. 1005-1009.

(Continued)

*Primary Examiner* — Chi H Pham
*Assistant Examiner* — Raul Rivas
(74) *Attorney, Agent, or Firm* — Dinsmore & Shohl, LLP

(57) ABSTRACT

Methods and systems for selecting a communication channel from a plurality of available channels in an infrastructure basic service set network having a plurality of access points APs comprising: monitoring the available channels for a scan time by a co-located radio station to capture signal level from APs at each channel; calculating weighted channel power level of each channel to determine the channel with minimum power and free channels from the available channels; receiving the signal level of each channel from co-located radio station to processor and calculating weighted channel power level of each channel to select the commu- (Continued)

nication channel, selecting communication channels comprises: identifying free channels; where only one free channel, select the free channel, where plurality, select the free channel with minimum interference less than a predefined value and with lower weighted channel power level, where no free channels, select the channel with minimum weighted channel power level.

8 Claims, 12 Drawing Sheets

(56) References Cited

U.S. PATENT DOCUMENTS

2015/0215950 A1 7/2015 Amini
2018/0124622 A1* 5/2018 Van Der Velde ..... H04W 24/10

OTHER PUBLICATIONS

International Search Report and Written Opinion dated Nov. 11, 2018 for Application No. PCT/IN2018/050527.

* cited by examiner

TABLE 1: Truth table for decision statement

|  | P | ¬Q | R | S |
|---|---|---|---|---|
| i) | T | X | X | T |
| ii) | F | T | T | T |
| iii) | F | F | T | F |
| iv) | F | X | F | F |

FIG. 16

TABLE II: Test scenarios

| Case No. | Environment | $i_{curr}$ | $i_{opt}$ | Interference Type | Complexity |
|---|---|---|---|---|---|
| 1 | - | X | $i_{curr}$ | None | O(1) |
| 2 | Fig.3 | 1 | 11 | Overlapping | |
| 3 | Fig.4 | 11 | 6 | Co-channel | |
| 4 | Fig.5 | 6 | 4 | Co-channel | O(11) |
| 5 | Fig.6 | 6 | 9 | Both | |
| 6 | Fig.7 | 1 | X | Both | |

FIG. 17

DYNAMIC CHANNEL SELECTION IN IEEE 802.11 NETWORKS

The present disclosure is a national stage entry of and claims priority to International App. No. PCT/IN2018/050527, filed Aug. 13, 2018, and entitled "DYNAMIC CHANNEL SELECTION IN IEEE 802.11 NETWORKS," which claims priority to IN App. No. 201741028737, filed Aug. 11, 2017, the entireties of which are incorporated by reference herein.

TECHNICAL FIELD

The present disclosure relates to a method and system for selecting a communication channel from a plurality of available channels in a network. More particularly, the present disclosure relates to a method and system for dynamically selecting a communication channel from a plurality of available channels in an infrastructure basic service set network based on wireless IEEE 802.11 standard to avoid co-channel and overlapping channel interference.

BACKGROUND

IEEE 802.11 standard is meant for Wireless Local Area Networks (WLAN). IEEE 802.11 WLAN deployment is widespread due to the availability of free unlicensed band, low-cost Access Points (APs) and enormous data demand. Infrastructure WiFi has become popular with public hotspots providing a free connection to the users and personal/enterprise networks being easily accessible in urban areas. The trend of offloading high bandwidth data from the 3G/4G network to WiFi network is also growing. Moreover, these technologies can be achieved at low costs and interoperability is guaranteed by standardization. In densely populated areas, it can be observed that the coexistence of spectrum which is in fact a scarce resource. However, like any other popular technology, WLAN has an unforeseen limitation triggered by the large-scale usage in an area.

IEEE 802.11 networks operate in 5 GHz (.11a) and 2.4 GHz (.11b/g) frequency bands. There are 23 orthogonal channels in the 5 GHz band and only 3 in the 2.4 GHz band [7]. The 5 GHz band is less crowded and free of interference. However, WiFi-enabled devices compatible with the 5 GHz band are less. So, in real-life scenarios, APs are generally configured in the 2.4 GHz band. Due to the limited number of channels in this band as shown in FIG. 1, new APs coming up in a locality have to coexist in a channel already occupied by other APs. This causes co-channel interference in that channel and overlapping interference with adjacent channels. A considerable interference among neighboring APs can cause degradation in downlink data throughput. This makes dynamic channel allocation crucial for designing 2.4 GHz wireless networks.

US2006029023A1 discloses a method and system for dynamically selecting a communication channel between an access point and a plurality of stations (STAs) in an IEEE 802.11 network. The method includes the steps of: determining whether a new channel between the AP and STAs within a particular basic service set (BSS) is needed; requesting a channel signal quality measure to some of the plurality of stations by the AP; reporting a channel signal quality report back to the AP based on a received signal strength indication (RSSI) and a packet error rate (PER) of all channels detected by the stations within the BSS; selecting a new channel based on the channel quality report for use in communication between the AP and the plurality of stations. Herein the channel measurement request is t sent to STAs to receive measurement report, there is no on device arrangement for such measurement at access point itself. It provides overhead in finding out better channel in the network.

Most of the APs use non-overlapping channels, which leads to co-channel and overlapping channel interference that should be minimized and avoided if necessary, using efficient selection of channels.

OBJECT

An object of the present disclosure is to provide Dynamic Channel Selection in IEEE 802.11 networks to minimize co-channel interference and overlapping channel interference to obtain improved data throughput and maintain system stability.

SUMMARY

An embodiment of the present disclosure provides a method for selecting a communication channel from a plurality of available channels in an infrastructure basic service set network having at least an access point and a plurality of stations, the method comprises: monitoring the available channels for system dependent scan time by a co-located radio station to capture signal level of the plurality of Access points at each channel; calculating weighted channel power level of each channel by a processor to determine the channel with minimum power or a list of free channels which have interference below a predetermined threshold value; receiving the signal level of each channel and weighted channel power level of each channel by the processor to select the communication channel, selecting communication channels comprises: identifying free channels; where there is only one free channel, the free channel is selected, where there is plurality of free channels, the middle free channel is selected, where there is no free channels, the channel with minimum weighted channel power level is selected.

Another embodiment of the present disclosure provides further step of calculating percentage change of the channel power which is equivalent to channel interference for channel switching, where the percentage change is more than a predetermined value, the access point is switched to selected channel by the processor or where the percentage change is less than the predetermined value and the current channel is non orthogonal then the access point is switched to selected free channel by the processor.

Still another embodiment of the present disclosure provides a system for selecting a communication channel from a plurality of available channels in an infrastructure basic service set network having at least an access point and a plurality of stations, the system comprises: a wifi radio to provide access to the IEEE802.11 network, a co-located station for monitoring the available channels power; a processor for calculating weighted channel power level of each channel, selecting communication channel on the basis of free available channels or channel with minimum interference power and giving instruction to the wifi radio to switch channel on the basis of percentage change of the channel power with respect to current configured channel.

These and other features, aspects, and advantages of the present subject matter will become better understood with reference to the following description. This summary is provided to introduce a selection of concepts in a simplified form. This summary is not intended to identify key features or essential features of the subject matter, nor is it intended to be used to limit the scope of the subject matter.

BRIEF DESCRIPTION OF DRAWINGS

FIG. 16: Table I: truth table for decision statement
FIG. 17: Table II: Test scenarios

DETAIL DESCRIPTION OF THE INVENTION

The present disclosure relates to a dynamic channel selection (DCS) method in an IEEE 802.11 wireless local area network (WLAN) in which a plurality of wireless channels are used by a plurality of wireless stations in communication with an access point (AP), wherein each channel is selected dynamically to minimize co-channel interference as well as overlapping channel interference.

Figure 1:
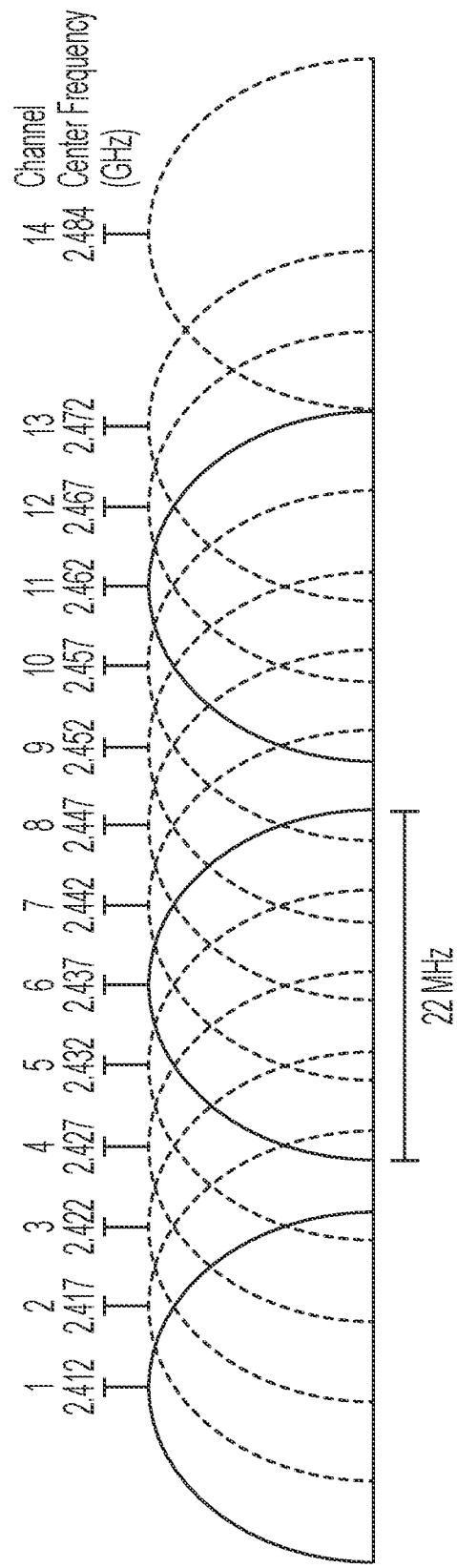
FIG. 1: 2.4 GHz WLAN channel list

2.4 GHz band is considered in this disclosure for dynamic channel selection for IEEE 802.11 wireless networks. FIG. 1 shows the 2.4 GHz WLAN channel list. This method assigns channels dynamically in a way that minimizes co-channel interference as well as overlapping channel interference. This improves the system performance in terms of data throughput and stability.

IEEE 802.11 WLAN Access Points (APs) are configured in the 2.4 GHz band extensively to cater for the needs of all WiFi-enabled devices. In densely populated areas this causes considerable interference amongst the APs since there are only three orthogonal channels. Downlink data throughput reduces due to co-channel and overlapping channel interference. Efficient channel selection is a significant problem due to the dynamic wireless environment. The Dynamic Channel Selection (DCS) of the present disclosure selects the optimal channel based on the periodic scan of the environment by a co-located monitoring radio unit. Frequent switching of channels is also reduced to maintain the AP's performance and stability. It is an innovative solution, readily applicable to the existing WLAN standard not necessitating any change in IEEE 802.11 MAC Layer. The results show an improvement of up to 35% in the data throughput in six different real-time network scenarios in our system.

Network Architecture

Figure 2:
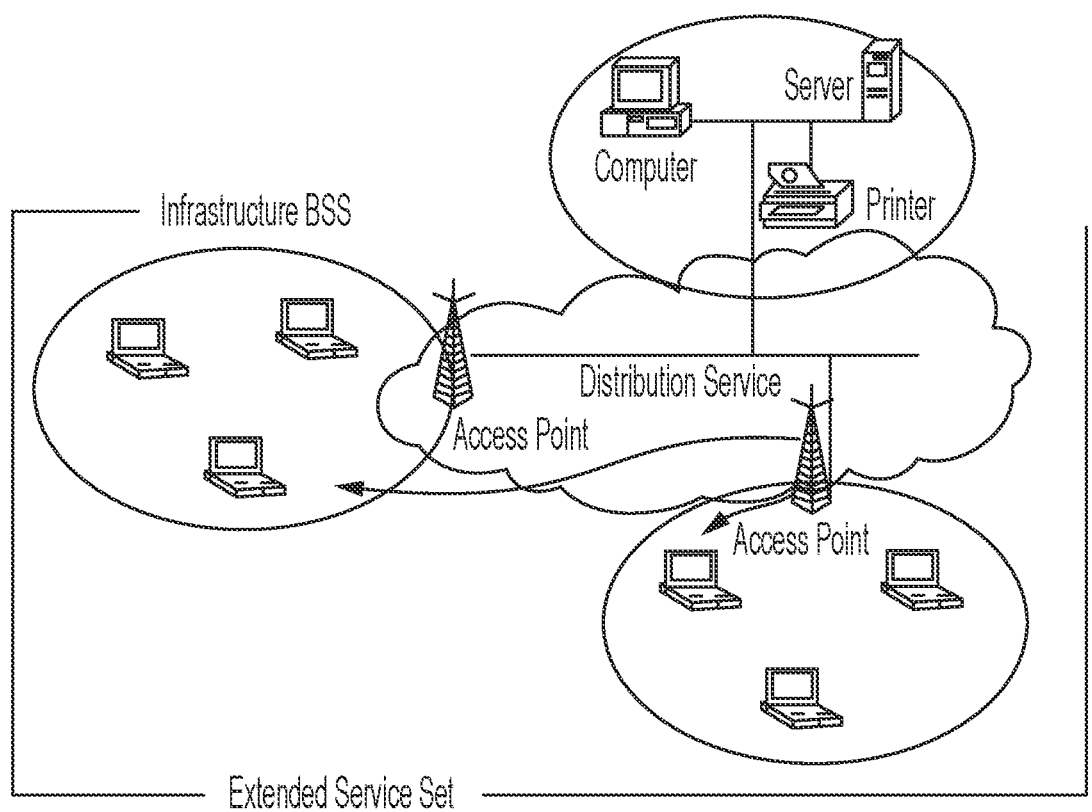
FIG. 2: Network Architecture

FIG. 2 shows the network architecture. There are two types of WLAN, Ad-hoc based and Infrastructure based. This work is considered for Infrastructure based WLAN Networks. IEEE 802.11 has two types of network elements: stations (STAs) and access points (APs). A STA is defined as the device that is equipped with a component that can communicate via IEEE 802.11 protocol over wireless medium.

A STA is called an AP if it is connected to a wired network and offers infrastructure service to mobile STAs. The networks composed of the combination of these actors are categorized as Independent Basic Service Set (IBSS) or Infrastructure Basic Service Set (Infrastructure BSS).

The growing number of networks based on wireless IEEE 802.11 standard has created some operational problems. The channel selection is one of the problems that appear in 802.11 networks operating in the infrastructure mode. In this mode, all packets are exchanged between STA and the AP.

Figure 3:
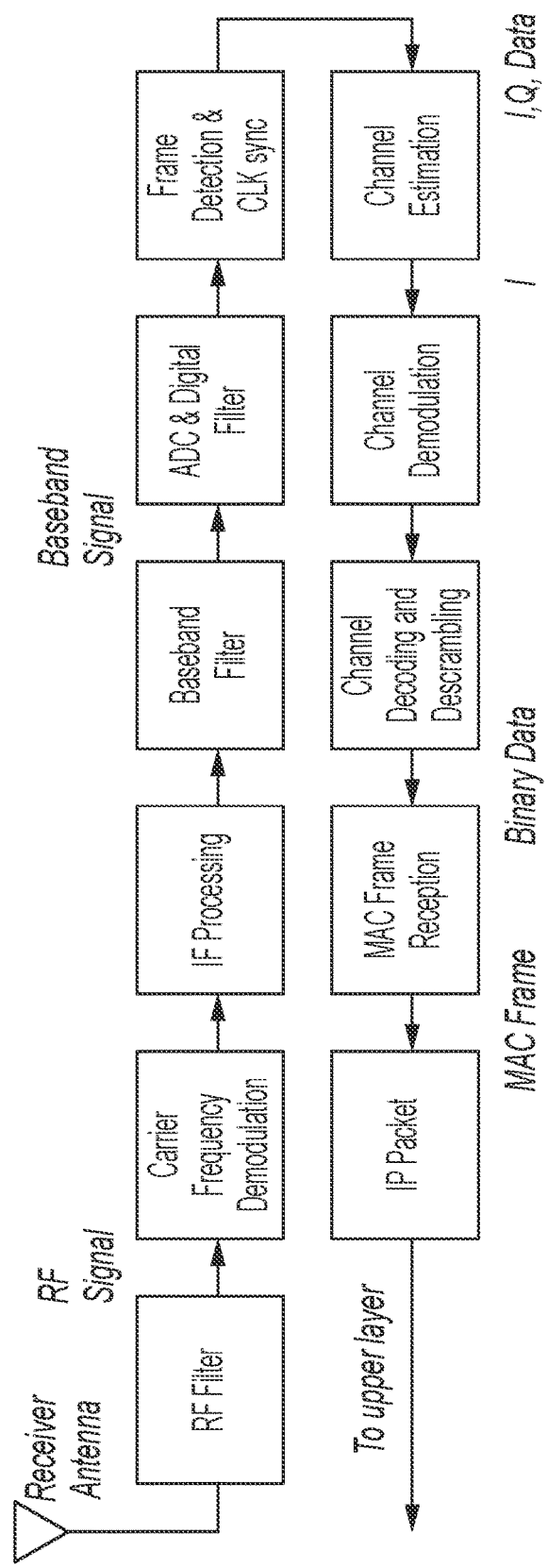
FIG. 3: Signal Flow

Wireless Signal travels from STA to AP (Uplink) and AP to STA (Downlink). FIG. 3 shows the signal flow. The Signal received at the AP from STA, is down converted from Carrier frequency (RF) to Channel frequency (baseband). Then, the received baseband signal will be demodulated and decoded, then the binary data will be received. This binary data is a MAC frame. It will be forwarded to PLCP and MAC layer. This frame will have information as per the IEEE 802.11 specification. These received frames will be combined and it will form IP packet and forwarded to upper layer.

Received packet will also contain physical layer signal strength (RSSI) in dBm. This information is retrieved from each received packet on each of the channels present in the 2.4 GHz band. This information is used to compute channel power in this proposed algorithm.

System Architecture

Figure 4:
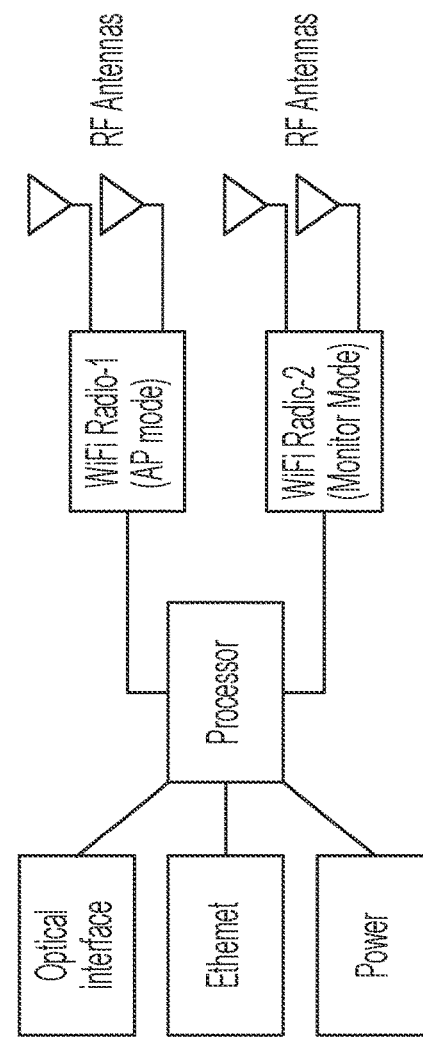
FIG. 4: System Architecture of Access Point

System architecture of AP is represented by FIG. 4. Dynamic Selection Algorithm is running on Processor. There are two RF units available in the system. Access point is configured on the WiFi Radio-1 and Monitor mode is configured on WiFi Radio-2. WiFi Radio-1 is configured in Master mode to give network access to the clients while WiFi Radio-2 is configured in the Monitor mode to scan the 2.4 GHz band. Both the WiFi Radios should have RF antennas with same characteristics so that their coverage areas superimpose. Ethernet or Optical interface can be used to connect with wired network. WiFi Radio-2 scans the 2.4 GHz band passively at regular intervals. It provides scan results to the host processor, where our DCS algorithm selects the optimal channel and takes the decision of channel switch of WiFi Radio-1.

WiFi Radio-2 does accurate channel scanning and power measurement of interfering APs since the channel characteristics remain same for both the co-located radios. It does passive scanning without affecting the processing of WiFi Radio-1. Popular mechanisms scan through clients or any reference AP and send the measurements to the AP. Messages exchanged in the wireless network may suffer from path loss apart from causing additional overhead. MAC changes are suggested to exchange these messages, however, the method of the present disclosure does not need any such change by the usage of WiFi Radio-2.

Mechanism

The method of present disclosure selects the operating channel automatically as well as dynamically. All the channels are monitored by co-located station in the system. This co-located station is configured in monitor mode. It does passive scanning of all the channels. Our DCS algorithm is designed as a continuous cycle of three primary actions: Spectrum Scan, Channel Selection, and Channel Switch Decision. Passive scanning of the spectrum is done by WiFi Radio-2 as discussed in section III. Beacon packets of neighboring APs in the 2.4 GHz band only need to be considered. Received Signal Strength Indication (RSSI) value, which signifies the power level, is determined for each of these packets. The cumulation of these power levels in a particular channel i, gives a clear picture of that channel interference and noise levels. This information is utilized to select the optimum channel $i_{opt}$. At the start of each cycle, the current configured channel number of the AP, $i_{curr}$, is retrieved. The channel switch decision is made by comparing the difference in power of $i_{opt}$ and $i_{curr}$ along with other factors to maintain stability and consistent throughput. The following parameters are given as input to start this method:
  Scan Time: $T_{Sc}$ is the time interval for Spectrum Scan.
  Sleep Time: $T_s$ is the time interval between two cycles.
    1) Stability Factor: α is the percentage change in channel power of $i_{opt}$ and $i_{curr}$ The algorithm has following steps:
1) Extract the initial configuration of AP and Virtual APs (VAPs) if any (SSIDs, mode, channel bandwidth).
2) Start timer $T_{Sc}$.
3) Initialize channel power array with zeros $P_i$=0, where channel number i={1, 2, . . . 11}.
4) Read the RSSI value for each AP present in i except our own AP and VAPs, if any. Convert it from dBm to mW and add it to $P_i$ to get the aggregate channel power of i.
5) Repeat step 3 till timer $T_{Sc}$ expires.
6) Calculate the weighted channel power $P_{wi}$ as per the mathematical channel power model, given in subsection B.
7) If $P_{wicurr}$=0, then retain AP operation on $i_{curr}$. Go to step 12.
8) Find the channel with minimum power level or interference-free channel (if available).
9) Select the optimal channel number $i_{opt}$ on the basis of Channel Selection, given in subsection B.
10) Extract $i_{curr}$.
11) Find output of Channel Switch Decision, given in subsection C. If affirmative, switch the channel to $i_{opt}$, retaining the configuration obtained in step 1.
12) Sleep for $T_s$ and repeat from step 2.

A. Spectrum Scan

In infrastructure WLAN, beacon frames are periodically broadcasted in the network. When WiFi Radio-2 receives a beacon frame, its wireless driver determines the RSSI and provides this information to the application layer via netlink. These values are processed by our method of the present disclosure to update $P_i$. Beacon frames of the AP and VAPs are discarded to ensure correctness of interference level with respect to our AP depends on the speed of the host processor and environment. $T_{Sc}$ has to be chosen such that the beacons of APs present in channel 1 to 11 should be captured only once, and the number of channel switches should be reasonable. $T_s$ should be decided as per the desirable frequency of spectrum scan.

B. Channel Selection Criteria

The Channel Selection principle is the unique and innovative solution to the optimization problem of determining the best channel in any dynamic environment. The cumulative channel power $P_i$ captured on each channel i per cycle of scanning time, $T_{Sc}$ by the monitoring station is dependent on the interference in the environment. Thus a weighted sum function on $P_i$ is implemented to compute the effect of co-channel interference and overlapping channel interference. One of the following weight function models can be used to generate the weighted channel power $P_{wi}$.
  1) Weight Function 1:

$$P_{wi} = \sum_{j=-1}^{1} (\delta_j \times P_{i+j}) \qquad (1)$$

where $\delta_j$ is the interference factor and is defined as:

$$\delta_j = \begin{cases} 0.5, & |j| = 1 \\ 1, & j = 0 \end{cases} \qquad (2)$$

2) Weight Function 2:

$$P_{wi} = \sum_{j=-2}^{2} (\delta_j \times P_{i+j}) \qquad (3)$$

where $\delta_3$ is the interference factor and is defined as:

$$\delta_j = \begin{cases} 0.25, & |j| = 2 \\ 0.5, & |j| = 1 \\ 1, & j = 0 \end{cases} \qquad (4)$$

Both the models consider co-channel interference by a factor of one and adjacent channel interference by a factor of half. The primary difference between them is the number of adjacent channels deemed to cause interference. While the first model accounts for interference only in the immediately adjacent channels, the second model considers interference of two channels on either side of the center frequency. In the first model, the variation in channel power is less whereas the second model is highly sensitive to change in the environment which may cause toggling of $i_{opt}$. The former has better performance in a crowded environment, but the latter is preferred in a sparsely populated environment. The weighting model can be chosen depending on the deployment scenario. In our work, we have considered the first design of weighted sum function.

$P_{wi}$ of every channel i is compared to detect free channels. A free channel is the channel where interfering APs do not exist or may be present at a distance such that they cause negligible deterioration of our AP's performance. It is mathematically defined as $$P_{wi} \leq 0.00001 \text{ mW} \qquad (5)$$

Figure 5:
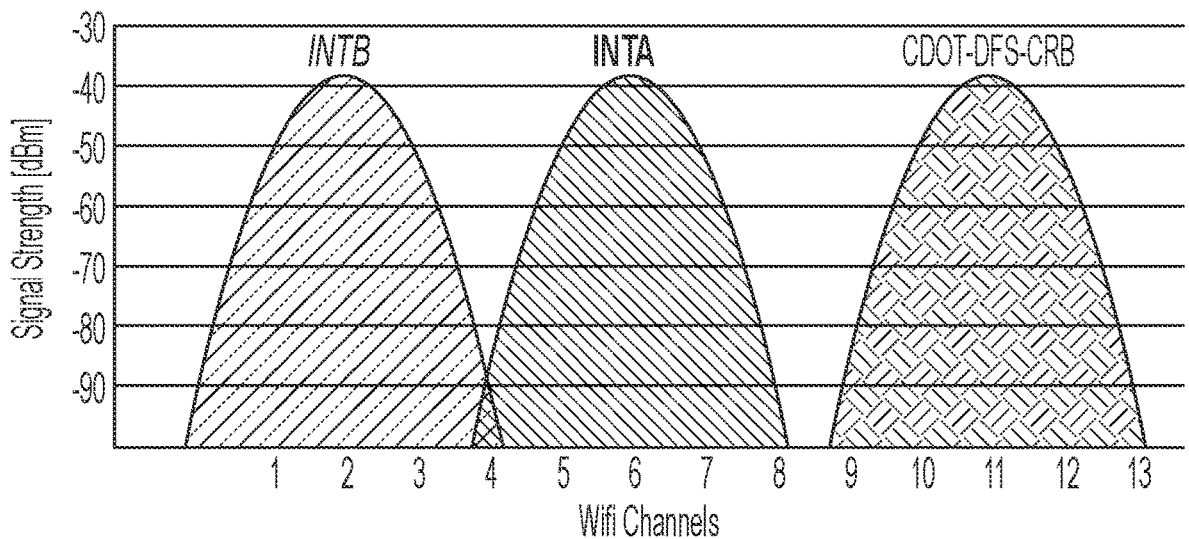
FIG. 5: Edge free Channel
Figure 6:
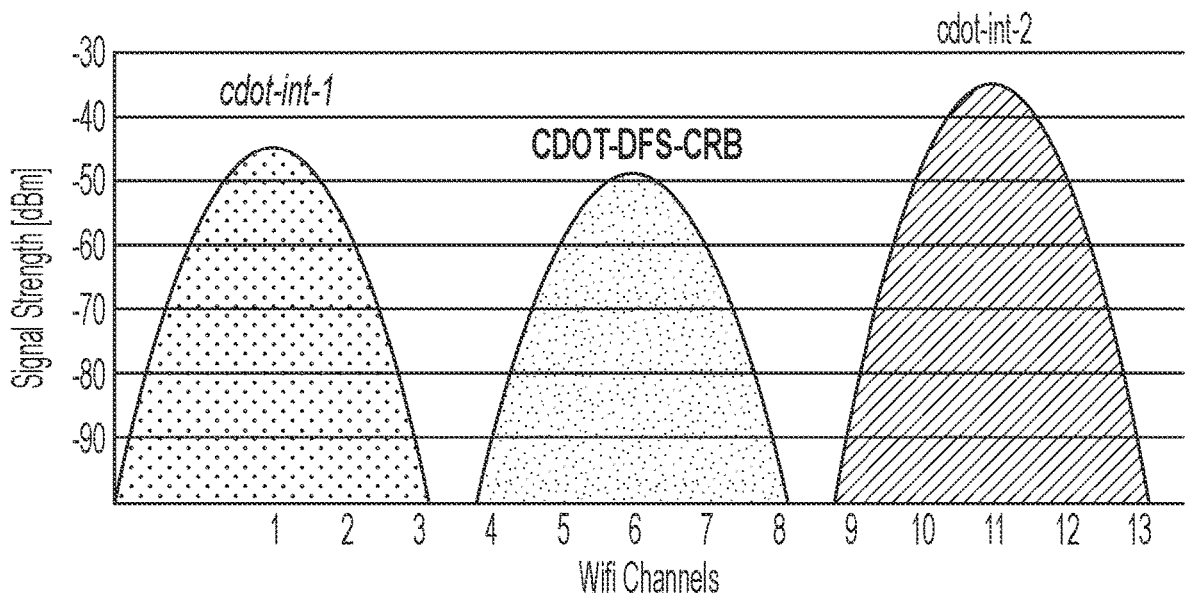
FIG. 6: Middle Orthogonal Free Channel
Figure 7:
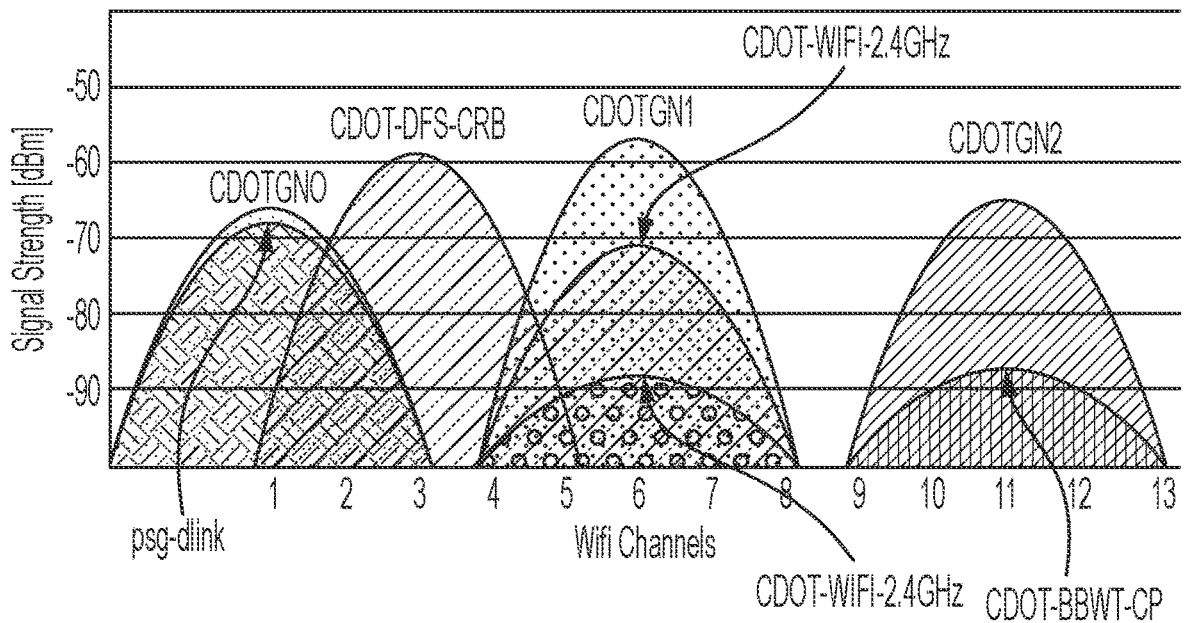
FIG. 7: Middle Free Channel
Figure 8:
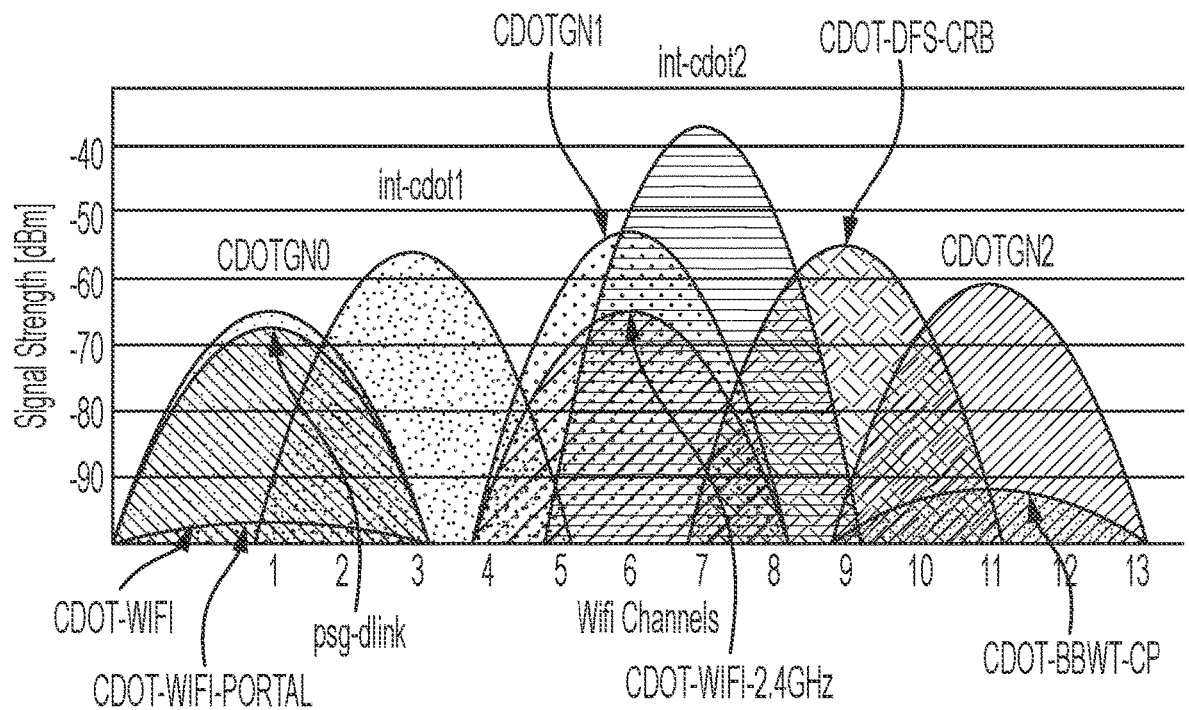
FIG. 8: Single Free Chanel

A set of such adjacent free channels is called a span of continuous free channels. Optimal channel selection is based on the following method.
  1) Find the span with the maximum number of free channels.
  2) If free channels are available, then select $i_{opt}$ as follows:
    a) If edge channels (1 or 11) are included in the span, then this edge channel is selected. This implicitly gives priority to the orthogonal channels. It is shown in FIG. 5.
    b) If the number of free channels is more than two, then the middle channel in the span is selected. (FIG. 6 and FIG. 7)

c) If there is only a single free channel, then this channel is selected. (FIG. 8)
3) If no free channels are available, then the channel with minimum power is selected (FIG. 9)
   All the figures are captured using WiFi Analyzer v3.11.2 Android application in real-life scenarios. "CDOT-DFS-CRB" is our AP which is operational in the optimal channel $i_{opt}$.

C. Channel Switch Criteria

Figure 10:
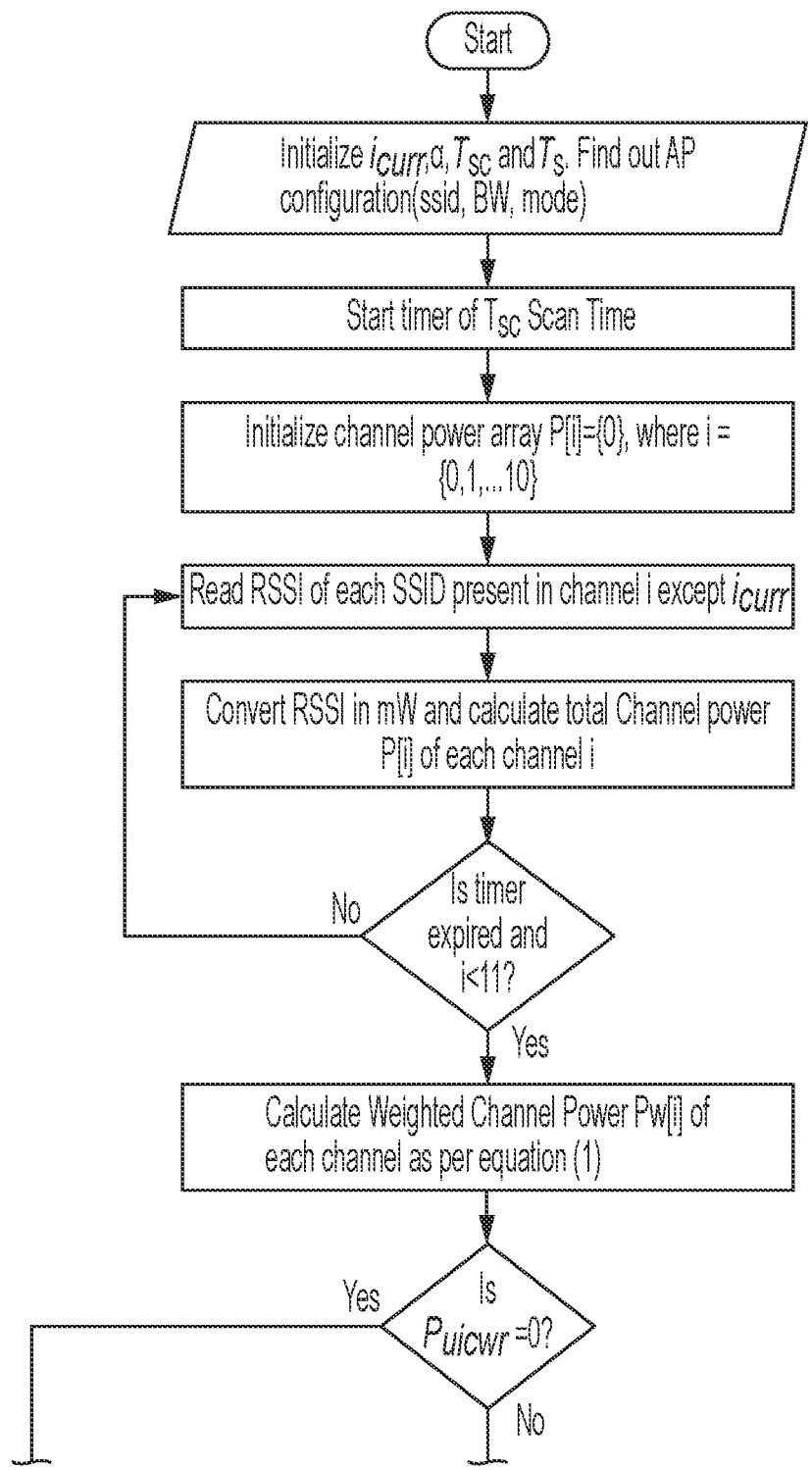
Figure 10:
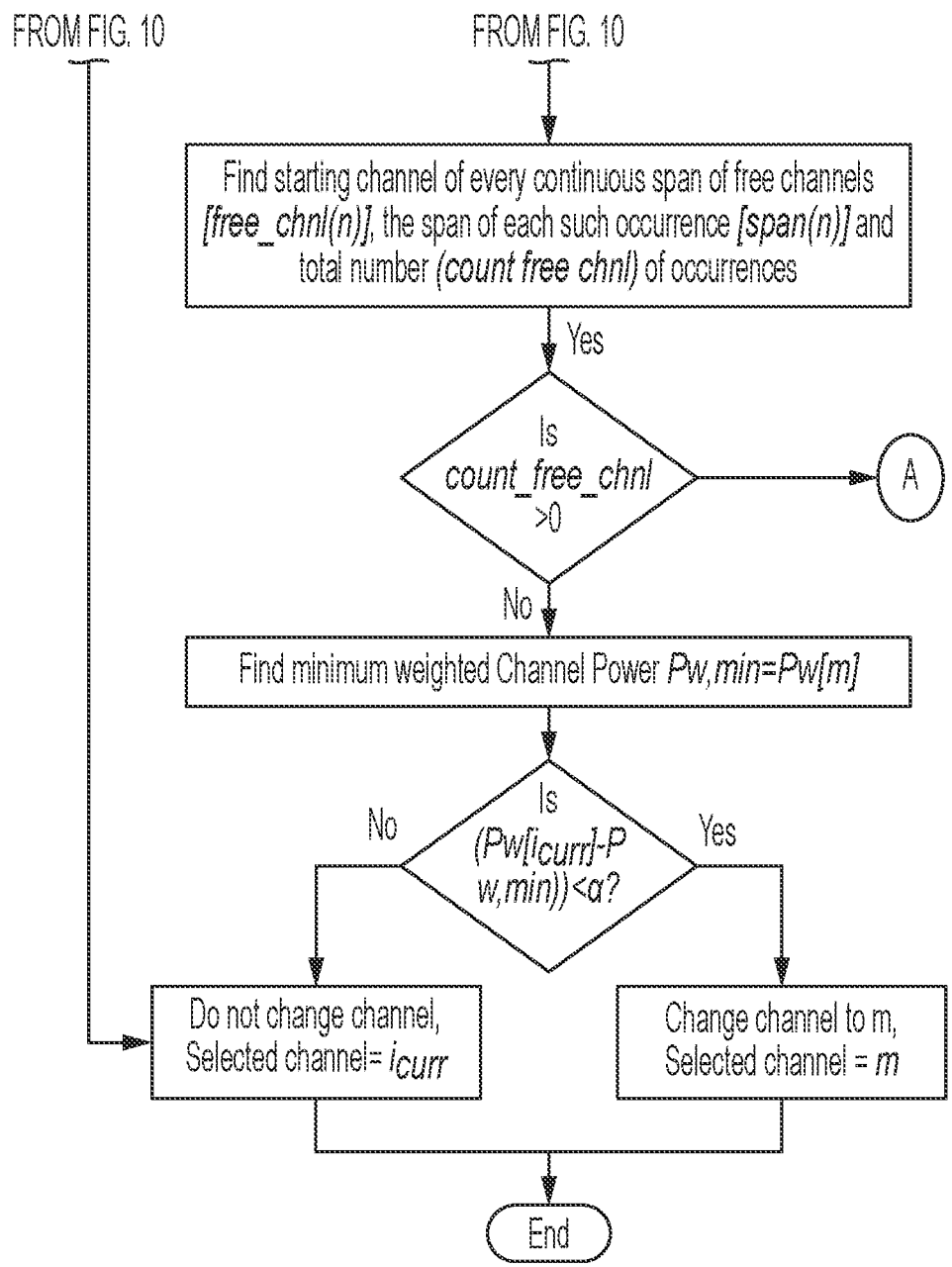
Figure 11:
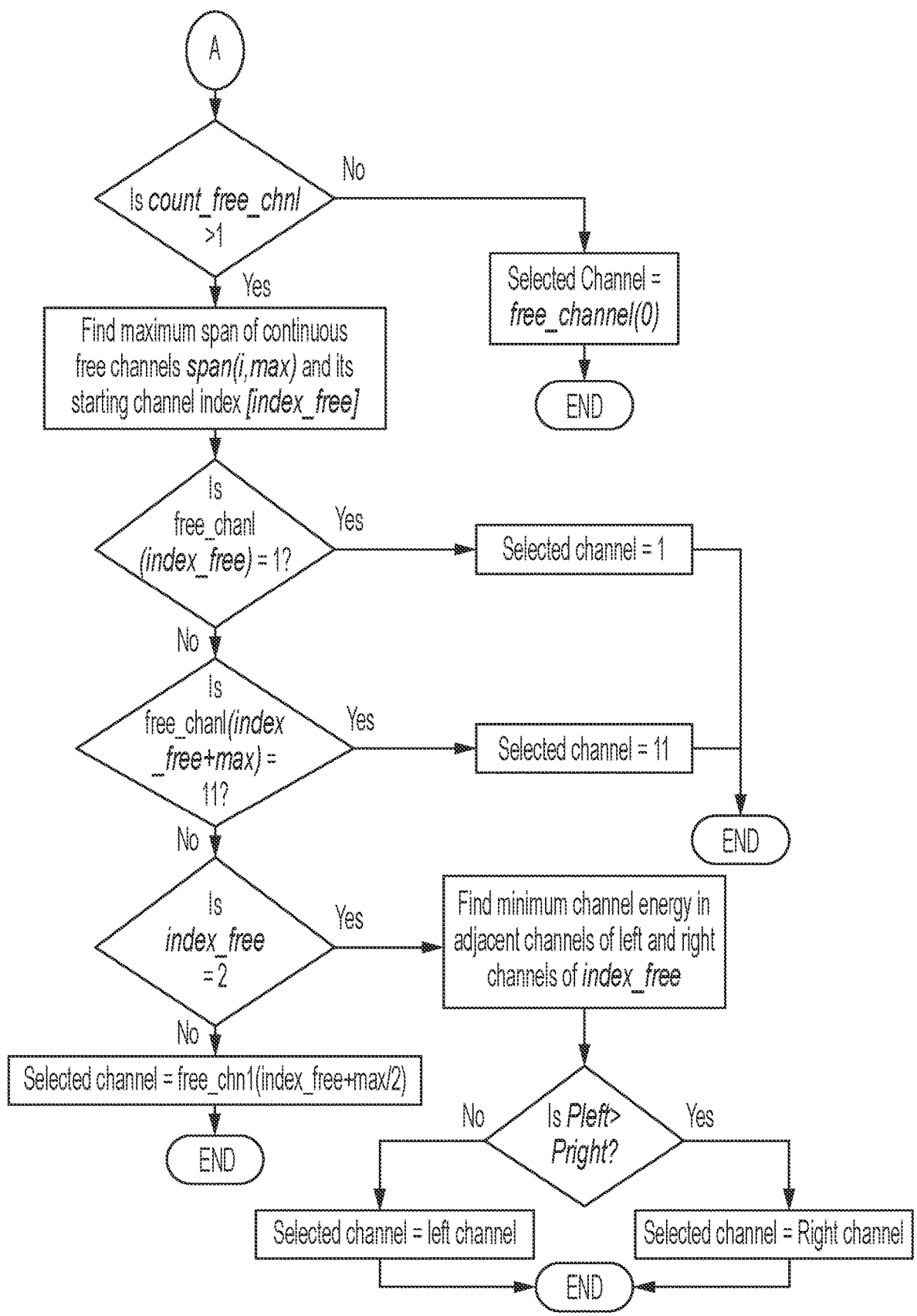

The Channel Switch Decision is the solution for the decision problem of whether the AP should be switched to $i_{opt}$, the output of the previous section. It is essentially based on the user-desired stability factor α, which implies the tolerance of interference by the AP. The value of α is inversely proportional to the number of channel switches. A lower value makes the AP switch to more often. In real-life deployment, due to this continuous toggling of the AP, total packets dropped while switching increases drastically. On the contrary, a higher value will fix our AP on a channel which may suffer from co-channel interference. It will also reduce the AP's sensitivity to the dynamic environment. Thus, a should be optimized with respect to the tolerance of AP for the best performance of this method. DCS method takes this a value as input in the beginning and decides to switch as follows:
1. Compute cumulative channel power difference ΔP.
2. Decide channel switching as per the truth value of following compound statement:—
   "Change in channel power is greater than α, or the current channel is not orthogonal and free channels are available"
   This decision statement is defined in propositional logic as $$\Delta P = \frac{P_{wi_{curr}} - P_{wi_{opt}}}{P_{wi_{curr}}} \times 100 \quad (6)$$

Where the propositions are
P: Change in channel power is greater than α
Q: Current channel is orthogonal
R: Free channels are available
Truth table for decision statement is indicated by FIG. 16.
a. If ΔP>α, then decide to switch channel irrespective of other conditions.
b. Even if ΔP<α, but $i_{curr} \notin \{11,6,11\}$ and $P_{wiopt}=0$, then decide to switch channel. Free or clean channel is given priority in this condition.
c. Even if $P_{wiopt}=0$, but ΔP<α and $i_{curr} \notin \{1,6,11\}$ then decide not to switch channel. Orthogonal channel is given priority in this condition.
d. If ΔP<α and $P_{wiopt}=0$, then decide not to switch channel.
FIG. 10 and FIG. 11 show the flow chart of above mentioned processes.

The method and system provided by present disclosure has various advantages such as Co-located AP and STA in system, no changes required in MAC and PHY layer, stability and improvement in throughput.

EXAMPLES

The following examples are given by way of illustration of the present disclosure and should not be construed to limit the scope of present disclosure. It is to be understood that both the foregoing general description and the following detailed description are exemplary and explanatory only and are intended to provide further explanation of the subject matter.

Performance Evaluation:
The AP uses Atheros-based IEEE 802.11 b/g/n radio as WiFi Radio-1 and WiFi Radio-2 with open source Ath9k driver. Power processor is used as processing platform with Ethernet backhaul of 1 Gbps as shown in FIG. 2. hostapd and hostapd_cli v2.5 are used for enabling AP and channel switching operation respectively. DCS algorithm is embedded in the open source application, horst v4.2 which is initially designed for band sniffing only.

Test Setup & Results:
AP running with DCS algorithm is System under test (SUT) in this test set-up.
SUT AP can be configured initially in any of the channel between 1 to 11 with g mode (legacy) or n mode (High Throughput), channel bandwidth 20 MHz or 40 MHz.
The AP is configured in IEEE802.11n mode with Tx power of 20 dBm and 20 MHz bandwidth on i curr as shown in Table II. A controlled environment is created inside a Radio Frequency (RF) enclosure for conducting throughput test for our AP in cases 1, 2 and 3. AP-Client data transfer of 20 Mb is also generated on the interfering APs to replicate the effect of real-time data load. Test cases 4, 5 and 6 are conducted in an instance of the dynamic wireless environment of laboratory (20×20 m) with around 10 interfering APs as illustrated in FIG. 7. Random real-time data transfer is present in these interfering APs. The six test scenarios are described in Table II as FIG. 17:

Best Scenario
   Case 1: No interfering APs are present in $i_{curr}$ r
Average Scenario
   Case 2: Interfering APs present in channels 2 & 6
   Case 3: Interfering APs present in channels 1 & 11
   Case 4: Interfering APs present in all orthogonal channels 1, 6 & 11
Worst Scenario
   Case 5: Interfering APs present in all the channel except channel 9
   Case 6: Interfering APs present in all the channels Throughput improvement is observed in all the above cases. The effective implementation of the DCS algorithm depends on two input parameters: Scan Time, $T_{Sc}$ and Stability Factor, α. The optimal value of these conditional parameters are derived in the following section, and the increment in throughput is also depicted.

Scan Time Selection:
Scan Time is the input parameter that depends on the host processor and environment. As discussed in section III, $T_{Sc}$ is selected such that the WiFi Radio-2 can capture the beacons across the spectrum accurately. It is evaluated by rigorously testing the behavior of the DCS algorithm on increasing the scan time and observing the number of channel switches caused thereof. This experiment is conducted for our AP over a period of 24 hours in an uncontrolled environment of Case 6. $T_{Sc}$ is varied from 1 to 15 seconds. DCS is initiated with α value fixed at 10% to ensure sensitivity to the unpredictable environment. $T_s$ is taken as thrice the value of $T_{Sc}$.

Figure 12:
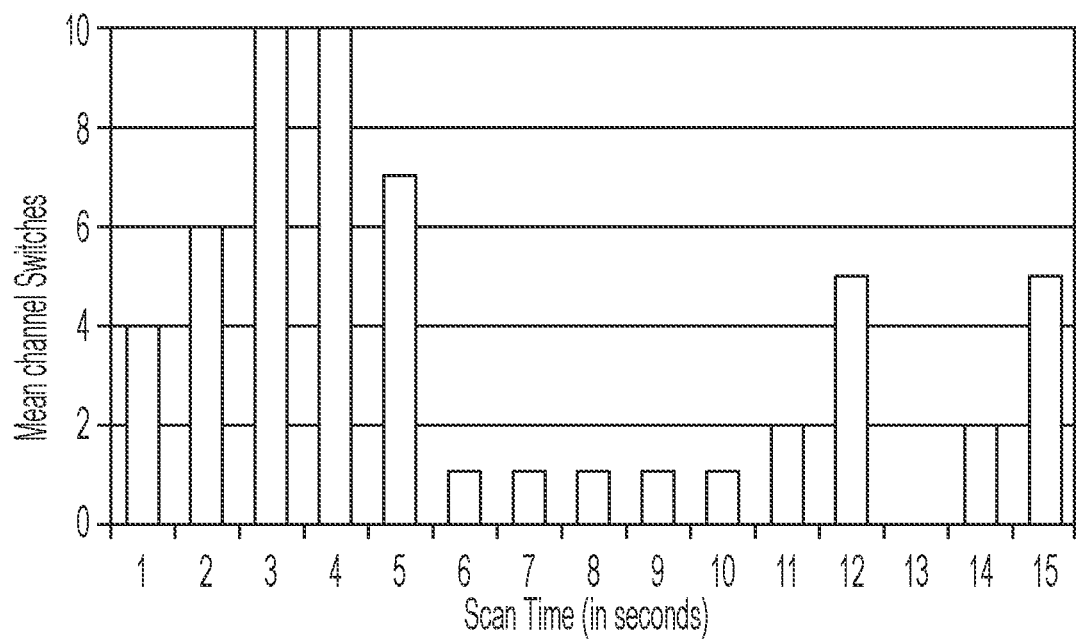
FIG. 12: Mean channel switches for varying scan time T Sc

In FIG. 12, the mean channel switches are calculated for 10 iterations of a particular scan time $T_{Sc}$. When $T_{Sc}$ ranges from 1 to 5 s, it is observed that our AP switches to i opt very frequently. $T_{Sc}$ of up to 5 seconds is not enough to capture all the beacons due to which some part of the spectrum is falsely identified to be unoccupied. Our DCS gives priority to these free channels and switches accordingly. For $T_{Sc}$>10 s, beacons of the same AP may be captured more than once which may make ΔP>α and thus cause an erroneous channel switch. Our AP exhibits a reasonable number of channel switches with $T_{Sc}$ value from 6 to 10 s. Thus, $T_{Sc}$ of 8 seconds and $T_s$ of 24 seconds is considered for further testing.

Figure 9:
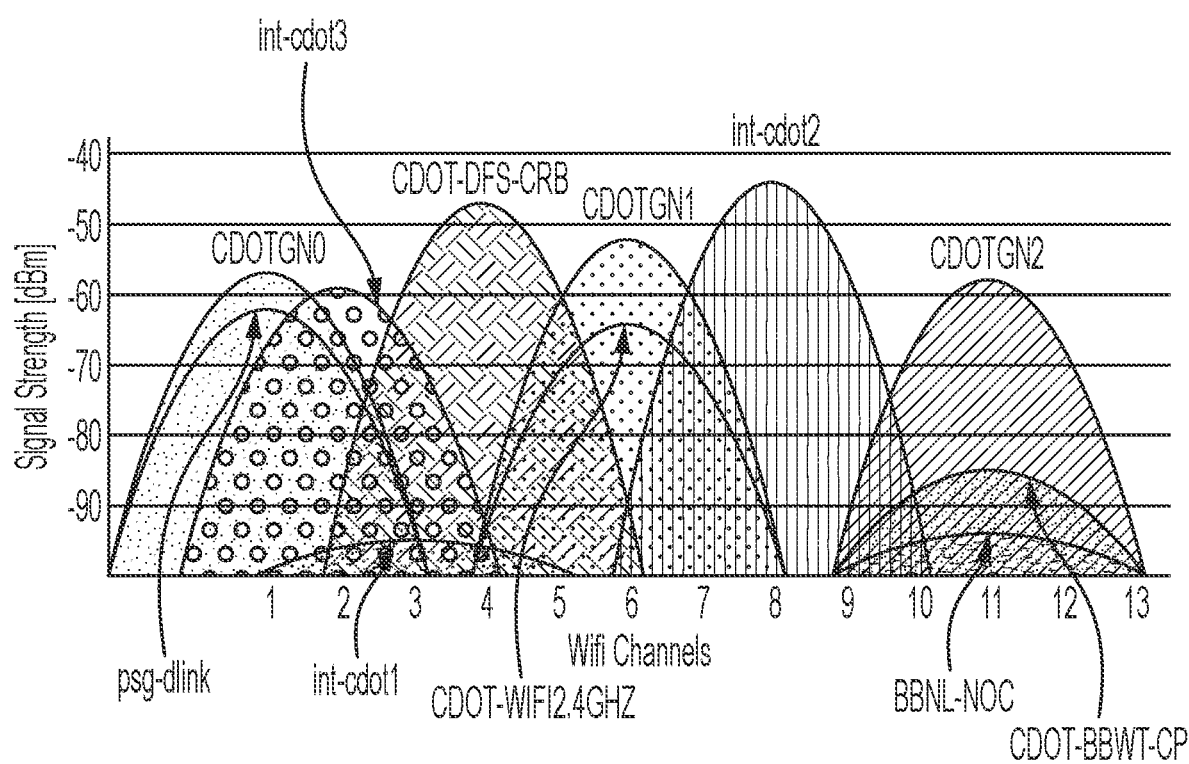
FIG. 9: No Free Channel
FIGS. 10 and 11 Dynamic Channel Selection Flow Chart
Figure 13:
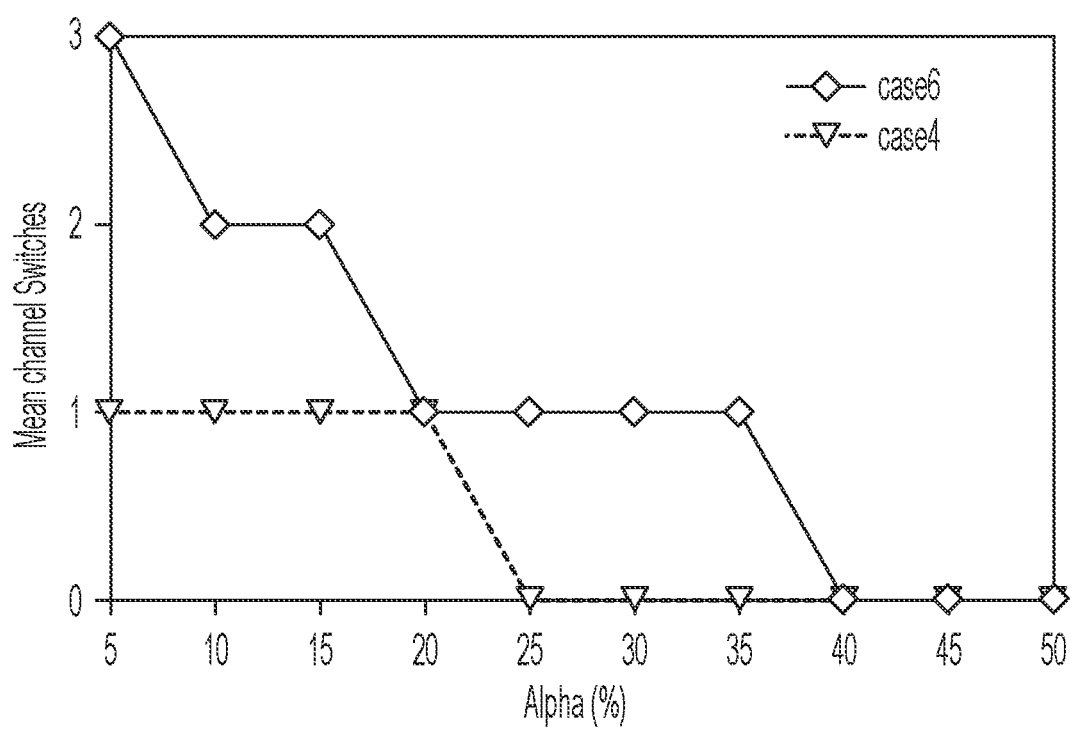
FIG. 13: Mean channel switches for varying Stability Factor α

Stability Factor:

The value of α is the stability factor of our system which defines the sensitivity towards interference in the environment as discussed in section III. In general, it can be chosen from the range of 20 to 35% as shown in the FIG. 13. α for our AP is chosen to be 20%, by observing the mean channel switches of 100 runs over α varying from 5 to 50%. Cases 4 & 6 are considered as they represent real-time network deployments. The optimum value of α is finalized to be 20% since there is the same number of mean channel switches for both the cases as shown in FIG. 9. For α<20%, more than one channel switch occurs which can incur higher overhead and less throughput improvement. With α value above 20%, channel switching reduces further, thus making the system insensitive to changes in the dynamic environment. As a result, throughput testing for our AP proceeded with α value fixed to 20%.

Figure 14:
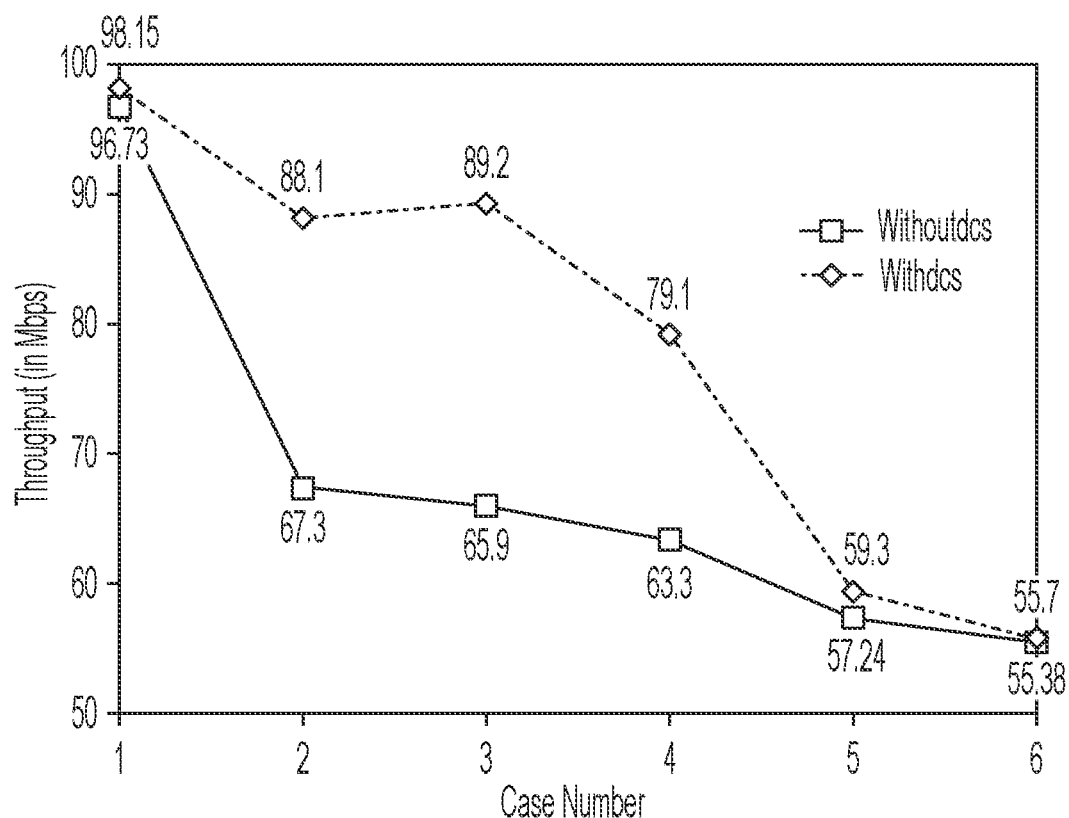
FIG. 14: Data throughput in different test cases

Data Throughput Measurements:

Throughput has been measured in all the scenarios with DCS and without DCS. The default configurations of SUT AP used in this test case are:
 Mode: HT mode
 Bandwidth: 20 MHz
 Channel: 1
 Scan Time: 8 Sec
 Sleeping Time: 24 Sec
 Alpha: 20
 Load in Channel 1: 20M
 Load in Channel 6: 10M
 Load in Channel 11: 20M A comparative study of the performance of our AP with and without the DCS algorithm implementation shows better throughput in the former case. Ideal throughput for IEEE 802.11n mode of operation for our AP is ≈100 Mbps over the association rate of 130 Mbps. Mean throughput is taken from 10 iterations of 100 Mb data transfer between our AP and Client for 5 minutes. Comprehensive testing in all the six test cases listed above has been carried out, and the result has been plotted as shown in FIG. 14.

The best environment for deploying an AP is having no kind of interference in its operating channel. In Case 1 which complies with this scenario, it is evident that data throughput results for AP running with or without DCS are comparable. Here the throughput is 98.15 Mbps since there is no channel switch. Other cases which undergo channel switch achieve slightly lesser throughput than the ideal value due to the overhead associated with channel switching. Case 2 addresses the impact of overlapping channel interference only. As shown in FIG. 3, if there are neighboring APs in channels 2 & 6, our AP which is initially operating in channel 1 experiences overlapping channel interference. In this case, DCS algorithm shifts it to channel 11 due to which throughput increases by nearly 31%. In the third case, co-channel interference is caused by interfering AP present in channel 11 where our AP is currently residing. By switching our AP operation to channel 6, throughput immensely improves by 35.6%. Case 4 also shows a similar co-channel interference scenario although the improvement in throughput is lesser (≈25%) than the previous case. This is expected since i opt still suffers from overlapping channel interference as shown in FIG. 5. The worst case scenarios are depicted in the last two cases where the environment is overcrowded. There is no interference-free channel across the whole spectrum in Case 6. Although in Case 5, i opt has no interference at its center frequency, there is considerable interference in the side sub-carriers. Hence the throughput improvement is negligible.

Data Throughput Comparison in Various Channels with Respect to DCS Channel

Figure 15:
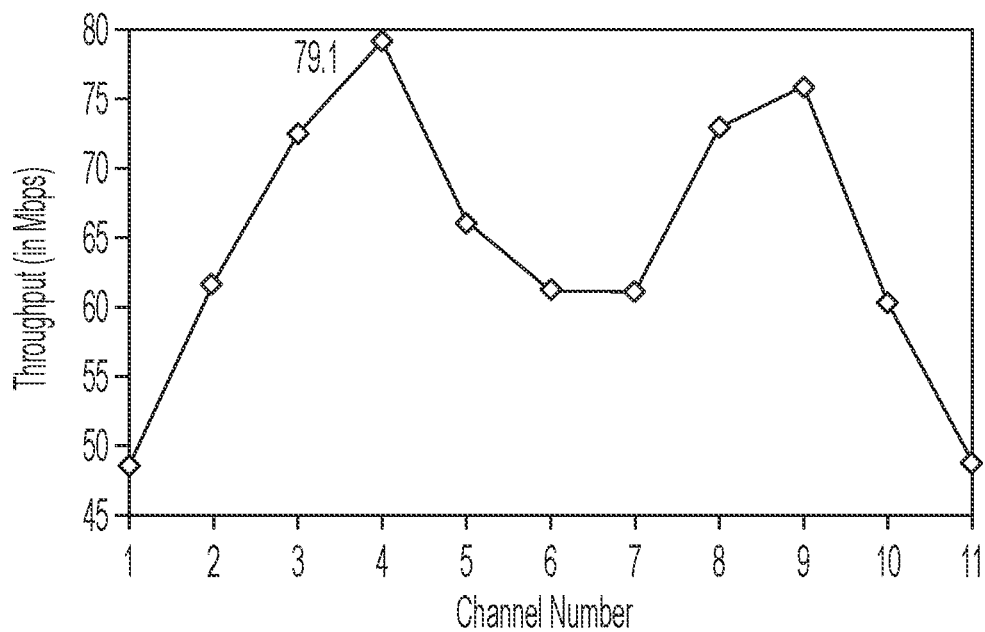
FIG. 15: Throughput comparison between $i_{opt}$ and other channels in Case 4

FIG. 15 shows a statistical comparison of the throughput obtained in various operational channels in the real-time environment shown in FIG. 7. Several interfering APs are present in channel 1, 6 and 11. "CDOTGN0" and "CDOTGN2" are two APs introduced to create active sessions of 20 Mb data transfer in channel 1 and 11 respectively. "CDOTGN1" has one active session of 10 Mb in channel 6. Under this condition, DCS switches our AP, "CDOT-DFS-CRB" to $i_{opt}$ i.e. channel 4. To study the performance of our AP in some other channel instead of $i_{opt}$, we configured our AP in each of the 11 channels in this environment. Throughput is measured by transferring data of 100 Mb for 5 minutes between our AP and Client.

Throughput is also measured when continuous data transfer is happening between interfering AP-client on different channels. Following configuration and load scenarios are taken while measuring throughput in case 5:
 Mode: HT mode
 Bandwidth: 20 MHz
 Channel: 1
 Scan Time: 8 Sec
 Sleeping Time: 24 Sec
 Alpha: 20
 Load in Channel 1: 20M
 Load in Channel 6: 10M
 Load in Channel 11: 20M Channel 4 has been chosen by DCS in this scenario. The FIG. 15 shows measured throughput.

Throughput has been measured using $i_{perf}$2.0.5 tool for UDP data. In all test cases, transmit data was 100 MB with 4 KB of packet size.

It is seen that maximum throughput is achieved in $i_{opt}$. Due to the higher load and co-channel interference in channels 1 and 11, the throughput is remarkably low. Channel 6 suffers from a slightly lesser load which improves the throughput. Overlapping channel interference in the channels 2, 5, 7 and 10 hampers the performance also. Better throughput (>70 Mbps) can be expected in the clear channels 3, 4, 8 and 9 which can be seen in FIG. 13. This result verifies that the optimal channel selected by our DCS algorithm is indeed the best channel under the given circumstances.

In the present disclosure, co-channel and overlapping channel interference detection is achieved by a co-located monitoring WiFi radio which passively scans the spectrum over a period. To avoid interference, two mathematical models have been designed to compute the cumulative channel power of the spectrum. Channel selection is an optimization problem since the deployment environment can be highly turbulent and unpredictable. The channel selected by our DCS mechanism is proven to be the best in six such real-time test cases. Channel switching is a decision problem and is solved by considering the stability factor and giving priority to the orthogonal channels as well as free channels. Considerable improvement of throughput is observed on using DCS algorithm in our AP. This algorithm is easily implementable and can be used on any generic processor platform. It works with existing IEEE 802.11 MAC and does not require any modification. It can cope with the interference caused by any neighboring IEEE 802.11 compliant AP and selects the optimal channel for better throughput. We have practically implemented this algorithm on our AP deployed in several real-time IEEE 802.11n networks.

Although the subject matter has been described in considerable detail with reference to certain preferred embodiments thereof, other embodiments are possible. As such, the scope of the disclosure should not be limited to the description of the preferred embodiment contained therein.

We claim:

1. A method for selecting a communication channel from a plurality of available channels in an infrastructure basic service set network, the method comprising:
    monitoring passively the available channels for a predetermined scan time by a co-located radio station to capture signal level from the plurality of access points at each channel;
    measuring received signal strength indication (RSSI) value from beacon packets of neighboring access points at each channel, which signifies power levels;
    obtaining cumulative channel power of particular channel by summation of the power levels wherein the cumulative channel power, captured on each channel per cycle of scanning time by a monitoring station is dependent on interference in environment;
    calculating weighted channel power level of each channel based on cumulative channel power of each channel and interference factor by a processor to determine free channels and the channel with minimum power from the available channels, wherein the interference factor is 1 in case of co-channel interference and 0.5 in case of adjacent channel interference, wherein for calculating weighted channel power level, the interference of two channels on either side of center frequency is considered and wherein the interference factor for the interference between the two extreme channels is 0.25;
    identifying free channels;
    where there is only one free channel, the free channel is selected,
    where there is plurality of free channels, the free channel with minimum interference less than a predefined value and with lower weighted channel power level is selected,
    where there is no free channels, the channel with minimum weighted channel power level is selected.

2. The method as claimed in claim 1 further comprising calculating percentage change of the channel power with respect to current configured channel for channel switching,
    where the percentage channel is more than a predetermined value, the selected channel is switched to another free channel by the processor,
    where the percentage change is less than the predetermined value and the current configured channel is non orthogonal then the selected channel is switched to another channel by the processor.

3. The method as claimed in claim 1, wherein the access point and the plurality of stations are the systems having Wifi radio.

4. The method as claimed in claim 1, wherein the infrastructure basic service set network is based on wireless IEEE 802.11 standard.

5. The method as claimed in claim 4, wherein the IEEE 802.11 standard does not require any change in its MAC layer.

6. The method as claimed in claim 1, wherein the infrastructure basic service set network has a bandwidth of 2.4 GHz band.

7. The method as claimed in claim 1, wherein the predetermined value is in the range of 5-50.

8. A system for selecting a communication channel from a plurality of available channels in an infrastructure basic service set network, the system comprises:
    a Wifi radio configured as an access point in the system which provides network access to the connected STAs
    a co-located Wifi radio for monitoring the available channels and measuring channel power level of each access point present in each channel;
    a processor for calculating cumulative and weighted channel power level of each channel and selecting communication channel on the basis of free available channels or available channel with minimum weighted channel power and for giving instruction to the Wifi radio to switch channel on the basis of percentage change of the channel power with respect to current configured channel;
    wherein for calculating weighted channel power level, the interference of two channels on either side of center frequency is considered and wherein the interference factor for the interference between the two extreme channels is 0.25.

* * * * *